(12) United States Patent
Lambiris

(10) Patent No.: US 6,170,208 B1
(45) Date of Patent: Jan. 9, 2001

(54) WINDSHIELD SPACER

(75) Inventor: Theodore R. Lambiris, Commerce Township, MI (US)

(73) Assignee: DaimlerChrysler Corporation, Auburn Hills, MI (US)

(*) Notice: Under 35 U.S.C. 154(b), the term of this patent shall be extended for 0 days.

(21) Appl. No.: 09/226,495

(22) Filed: Jan. 7, 1999

(51) Int. Cl.⁷ .................... E06B 7/00; B60J 1/02
(52) U.S. Cl. ........................ 52/204.597; 296/90
(58) Field of Search ............. 52/204.591, 204.593, 52/204.597, 204.62, 204.67; 296/84.1, 85, 90, 93, 96.12, 96.21, 77.1

(56) References Cited

U.S. PATENT DOCUMENTS

| | | | |
|---|---|---|---|
| 2,078,731 | * 4/1937 | Norris | 52/204.597 |
| 2,247,933 | * 7/1941 | Willer | 52/204.597 |
| 2,966,707 | * 1/1961 | Ellis | 52/204.591 |
| 3,191,727 | * 6/1965 | Schmelyz et al. | 52/204.593 |
| 3,652,380 | * 3/1972 | Strack | 52/204.591 |
| 3,807,107 | * 4/1974 | Davis | 52/204.591 |
| 3,879,241 | 4/1975 | Butler . | |
| 4,472,914 | * 9/1984 | De Boef et al. | 52/204.593 |
| 4,505,511 | 3/1985 | Hanle et al. . | |
| 4,853,055 | 8/1989 | Taylor . | |
| 5,489,135 | 2/1996 | Lipinski . | |
| 5,528,868 | 6/1996 | Yada et al. . | |
| 5,529,366 | 6/1996 | Gold . | |
| 5,538,314 | 7/1996 | Young et al. . | |
| 5,592,795 | * 1/1997 | Rinehart et al. | 52/204.591 |

\* cited by examiner

*Primary Examiner*—Michael Safavi
(74) *Attorney, Agent, or Firm*—Lawrence J. Shurupoff

(57) ABSTRACT

A one-piece rubber or elastomeric block has a relatively hard or rigid base portion and a relatively soft or compliant ledge portion. The base prevents a windshield from sliding downward as it is being bonded to a window frame of a vehicle and the ledge serves as a compliant cushion which prevents the weight of the windshield from extruding a soft bead of urethane or other sealer from between the windshield and the frame. The elastomeric block sits within a channel of a vehicle window frame. A windshield is mounted upon the vehicle window frame, resting upon the elastomeric block and attached to the frame via the bead of urethane.

2 Claims, 1 Drawing Sheet

WINDSHIELD SPACER

BACKGROUND OF THE INVENTION

1. Field of the Invention

The present invention relates in general to resilient pads used in the assembly of a windshield to a motor vehicle and in particular to an elastomeric pad located between a windshield and a sheet metal cowl extending from an instrument panel of an automobile.

2. Description of Prior Developments

Windshields are typically bonded to a vehicle using a bead of urethane. As the urethane takes many hours to set up and cure, some form of support is generally required for locating and holding the windshield in position until bonding is complete. In the past, elastomeric blocks were placed between the bottom edge of a windshield and a sheet metal cowling to prevent the windshield from sliding downward toward the cowling. The support was generally of a relatively high durometer rubber or elastomeric material. A second spacer was typically located beneath the inside of the windshield and an adjacent cowling for spacing the windshield or window a predetermined height above the cowling to allow the bead of urethane to set up and cure with a predetermined thickness or height.

Although this prior method worked somewhat satisfactorily, it was found necessary to form the two spacers of different durometer materials. This resulted in a relatively costly assembly, and, for various reasons, resulted in a relatively high number of defects in the nature of water leaks through the urethane bond.

Accordingly, what is needed is an inexpensive and easily assembled spacer for locating and supporting a windshield as a urethane bond cures and secures the windshield to the frame of a vehicle.

Another need exists for such a spacer which provides both horizontal and vertical support in such a manner that relatively rigid support is provided along the plane of the windshield and relatively compliant and conforming support is provided in a plane perpendicular to that of the windshield.

Still another need exists for a spacer which provides two levels of compliance and support with a single unitary elastomeric spacer.

SUMMARY OF THE INVENTION

The present invention has been developed to meet the needs noted above, and therefore has as an object the provision of a one-piece spacer for supporting a windshield both horizontally and vertically as the windshield is held in place during bonding and curing of a urethane seal around the windshield.

Another object of the invention is the provision of a one-piece windshield spacer which provides a relatively stiff support along the plane of a windshield and a relatively compliant or soft support in a direction perpendicular the plane of the windshield.

A further need exists for a windshield spacer formed as a unitary homogeneous molding or extrusion which is configured in such a manner that it provides variable degrees of compliance and support.

BRIEF DESCRIPTION OF THE DRAWINGS

In the various figures of the drawings, like reference characters designate like or similar parts.

DETAILED DESCRIPTION OF THE PREFERRED EMBODIMENTS

Figure 1:
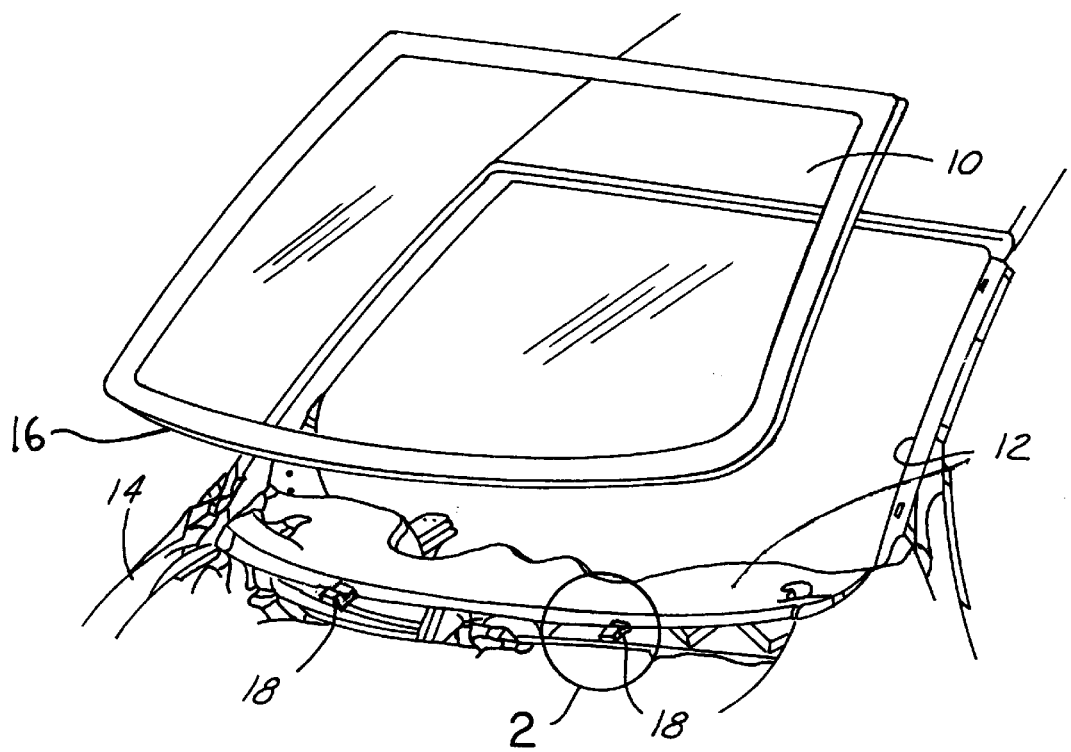
FIG. 1 is a schematic partial perspective view of a portion of a vehicle having a windshield being fitted to a vehicle frame and aligned over a pair of spacers constructed in accordance with the invention.
Figure 2:
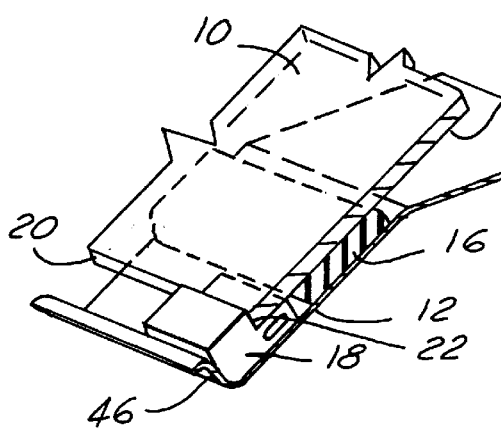
FIG. 2 is an enlarged view in fragment of section A—A of FIG. 1 after the windshield has been installed.

The present invention will now be described in conjunction with the drawings beginning with FIG. 1 which shows a windshield or window 10 being bonded to the window frame 12 of a vehicle 14 in accordance with the invention. As seen in FIG. 2, the windshield 10 is bonded to the frame 12 with a bead of urethane 16 in a conventional fashion. The urethane 16 is typically applied to the underside of the windshield 10 and then subsequently pressed onto the frame 12. Since the urethane can take several days to fully set up and cure, one or more spacers 18 are used to locate and hold the windshield 10 in place on the frame 12 until the urethane 16 sufficiently cures and sets up to securely hold the windshield by its own bond strength.

As further seen in FIG. 2, the bottom edge 20 of windshield 10 rests in a right-angled step 22 formed in the spacer 18. The underside 24 of the windshield is also supported within step 22. In this manner, the windshield is spaced and supported both horizontally and vertically with respect to the vehicle frame 12.

Figure 3:
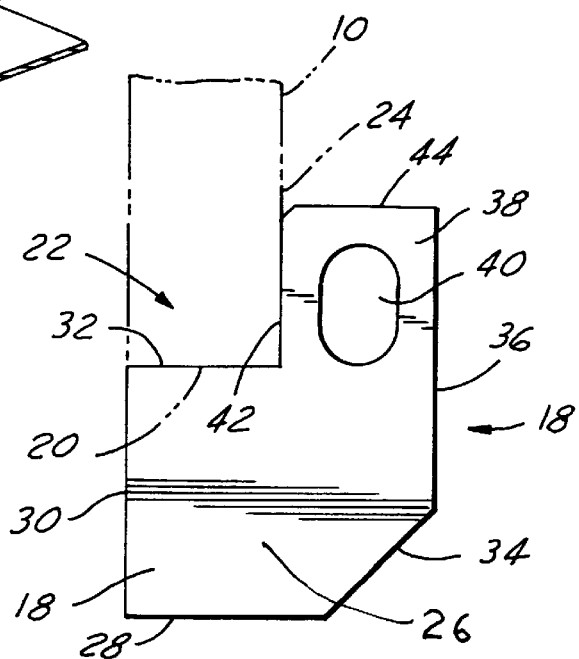
FIG. 3 is side view of the windshield spacer of FIGS. 1 and 2.

As seen in FIG. 3, spacer 18 includes a substantially rectangular base portion 26 having a flat bottom wall 28, a flat front wall 30 and a flat top wall 32 which forms a support surface for the bottom edge of windshield 10. A diagonal back face or chamfer 34 extends upwardly and rearwardly from the bottom wall 28 to intersect a rear wall 36 which extends upwardly to a hollow ledge portion 38.

The ledge portion 38 has a substantially rectangular shape through which a bore or channel 40 extends along the full transverse length of the ledge portion. Channel or bore 40 may have any shape, however, the generally oval shaped bore shown in FIG. 3 performs well by providing a soft compliant support to windshield 10. Ledge portion 38 extends upwardly from the base 26 adjacent top wall 32 along a front support wall 42 which extends substantially parallel to the rear wall 36.

The front support wall 42 together with the top wall 32 define the right-angled step or recess 22 within the spacer 18. An upper wall 44 spans the front support wall 42 and the rear wall 36 and extends substantially perpendicular to each. The entire spacer, including the base portion 26 and the ledge portion 38 can be formed as a homogeneous one-piece extrusion. Bore 40 can also be formed during the extrusion process.

Referring again to FIG. 2, it can be appreciated that when the spacer 18 is securely nested within the L-shaped channel 46 formed on the bottom of frame 12, step 22 provides a secure seating and anchorage for the lower edge 20 of the windshield 10 as well as the adjoining portion of the underside 24 of windshield 10. The top wall 32 of the spacer 18 prevents the windshield 10 from sliding downwardly onto the channel 46 as the bead of urethane 16 cures. The height of front wall 30 is selected to provide the required spacing and alignment of the windshield on the frame 12.

Because the base 26 of the spacer 18 is formed of a solid mass of elastomeric material, it does not compress to any significant extent along the plane of windshield 10. That is, the windshield 10 does not compress the top wall 32 towards the bottom wall 28 to any significant degree due to the solid nature of the base 26.

However, the hollow ledge portion 38 of the spacer 18 is significantly more flexible, compliant and more easily deformed than the solid base 26 due to the formation of the channel or bore 40 therethrough. This flexibility afforded the ledge portion 38 is most desirable for accommodating irregularities and manufacturing tolerances between the frame 12 and windshield 10.

That is, the undersurface 24 of windshield 10 is subject to slight waves or undulations, and the surface of the L-shaped channel of frame 12 along the bottom edge 20 of windshield 10 is also subject to irregularities such as welds and small imperfections. The hollow ledge portion 38 simply compresses to conform to the bumps, waves and grooves present between the windshield and frame. This allows the windshield to set itself relatively evenly around the frame and thereby maintain the continuity and integrity of the bond and seal formed by the curing urethane.

It should be understood that while this invention has been discussed in connection with one particular example, those skilled in the art will appreciate that other modifications can be made without departing from the spirit of this invention after studying the specification, drawings, and the following claims.

What is claimed is:

1. In a motor vehicle, a vehicle windshield assembly comprising:

a vehicle window frame;

a windshield mounted on said window frame and comprising an underside and a bottom edge;

an adhesive bond bonding said underside of said windshield to said window frame;

a one piece windshield spacer supported on said window frame and comprising a rigid base, a compliant ledge extending from said base and having a bore formed therein, and a step defined between said base and said ledge; and said bottom edge of said windshield seated on said step, said underside of said windshield seated on and compressing said ledge, and said step and said ledge supporting and spacing said windshield horizontally and vertically above said window frame with a desired spacing as said adhesive bond cures.

2. The assembly of claim 1, wherein said window frame comprises a channel and wherein said base is nested in said channel.

* * * * *